April 28, 1942.  W. H. BASELT ET AL  2,280,782
RAILWAY BRAKE
Filed Dec. 6, 1939   3 Sheets-Sheet 1
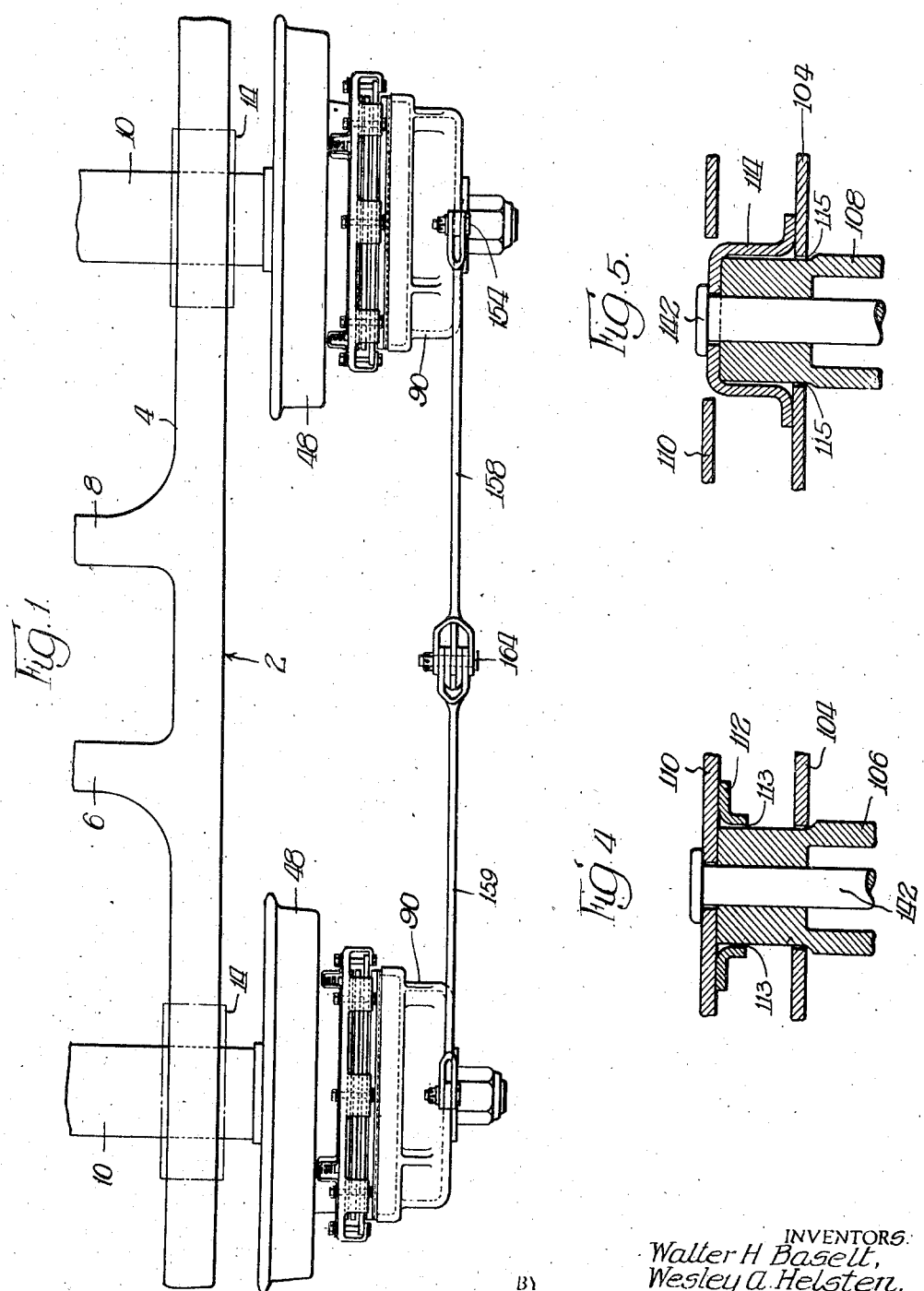
INVENTORS.
Walter H Baselt,
Wesley A. Helsten,
BY
ATTORNEY.

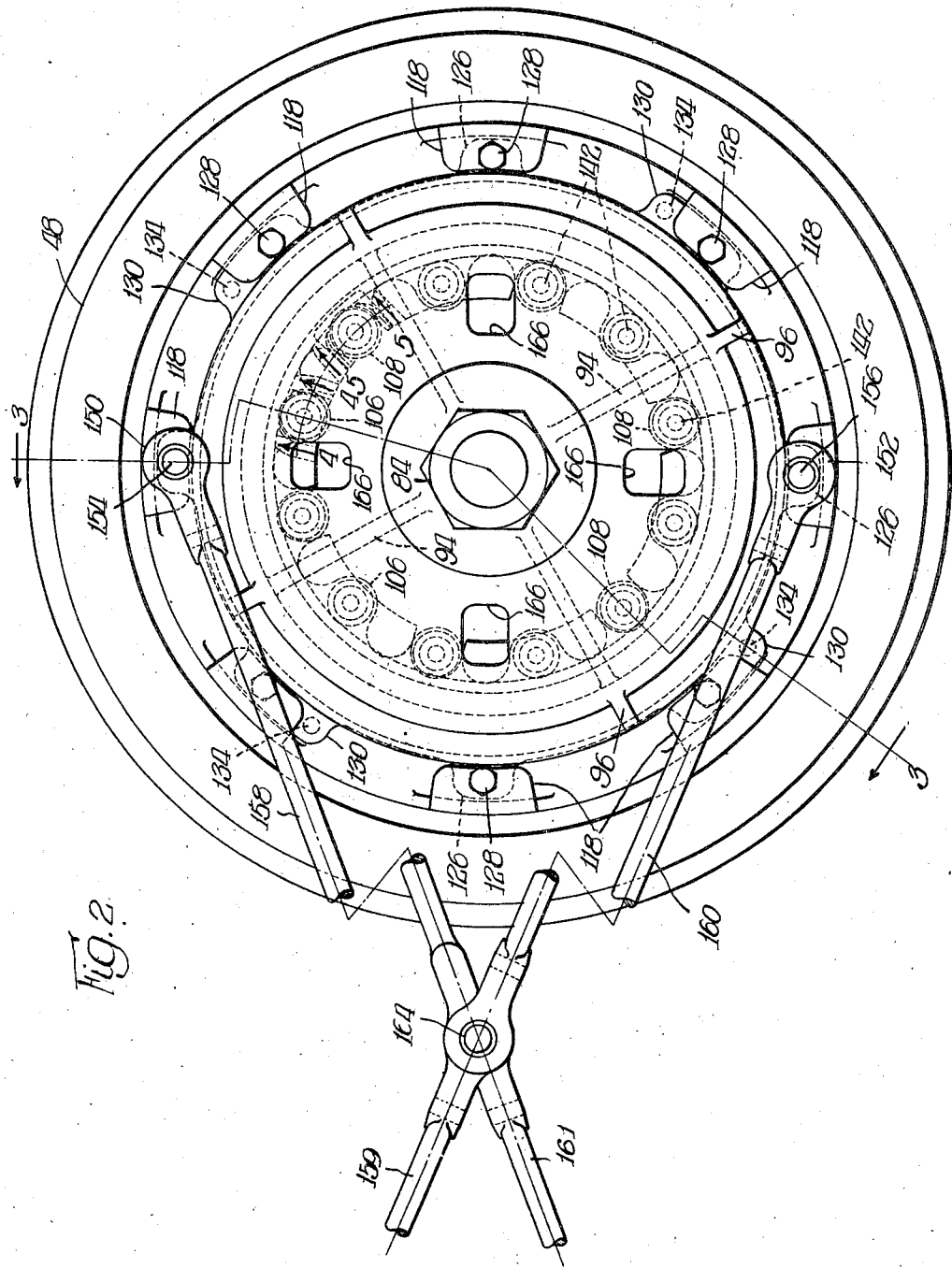

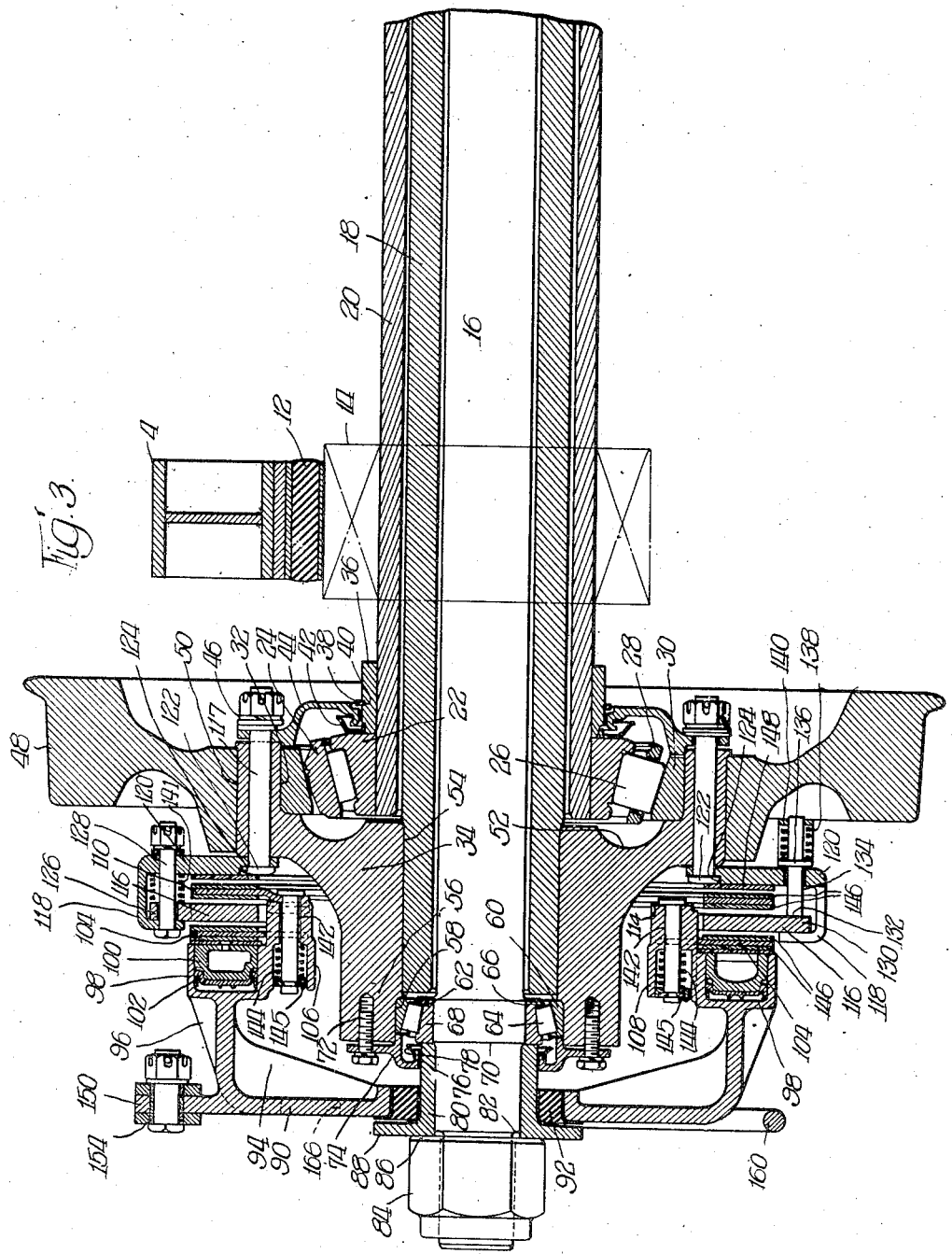

Patented Apr. 28, 1942

2,280,782

UNITED STATES PATENT OFFICE 2,280,782

RAILWAY BRAKE

Walter H. Baselt and Wesley A. Helsten, Chicago, Ill., assignors to American Steel Foundries, Chicago, Ill., a corporation of New Jersey Application December 6, 1939, Serial No. 307,736

36 Claims. (Cl. 188—153)

Our invention relates to vehicle brakes, and more particularly to a braking arrangement having rotors and stators used as the braking means. The modification illustrated here is shown adapted to a railway wheel and axle assembly having an inboard journal box and braking means outboard the wheel.

Changes in modern railway train designs have facilitated the rise of novel braking designs which function independently of the tread surfaces of the wheels. Our invention includes such a braking arrangement wherein the braking force is developed in a novel arrangement of interleaved rotating and nonrotating elements.

An object of our invention is to provide a braking arrangement having rotors and stators outboard the wheels of the wheel and axle assembly.

Another object of our invention is to provide a braking arrangement in which rotor means may be supported from the wheel, and stator means may be supported from an inner nonrotating axle.

Another object of our invention is to provide a braking arrangement wherein stators and rotors may have independent release means to return them to their normal position after the brakes have been released.

A further object of our invention is to provide a vehicle brake wherein the operating means may be resiliently mounted on the wheel and axle unit.

A still further object of our invention is to provide an arrangement wherein the torque arms for the stator assembly of one wheel and axle assembly may have cooperative connection with the torque arms of the adjacent wheel and axle assembly on the same side of the truck structure.

A yet further object of our invention is to provide a railway brake of the rotor and stator type which may be adapted to a wheel and axle assembly having a rotating axle and a plurality of non-rotating axles.

Referring to the drawings,

Figure 1 is a top plan view showing our invention adapted to a railway truck, only one-half of the truck structure being shown inasmuch as the brake arrangement is similar on opposite sides thereof.

Figure 2 is a fragmentary side elevation of one of the wheel and axle assemblies shown in Figure 1.

Figure 3 is a sectional view taken substantially in the plane indicated by the line 3—3 of Figure 2 showing our invention in greater detail.

Figure 4 is a sectional view taken substantially as indicated by the line 4—4 of Figure 2, showing our means of supporting the inboard stator; and Figure 5 is a sectional view taken substantially as indicated by the line 5—5 of Figure 2, showing our means of supporting the outboard stator.

Describing our drawings in more detail, the truck frame generally indicated at 2 comprises the side member 4 having the spaced transoms 6 and 8 integrally formed therewith serving as the usual means of support for the bolster (not shown). The side member 4 may be resiliently mounted as at 12 (Figure 3) through the medium of the inboard journal box 14. Each wheel and axle assembly 10 comprises an inner nonrotating axle 16, an intermediate rotating axle 18 sleeved thereover, and an outer rotating axle 20 sleeved over the intermediate axle 18.

Adjacent the end of the outer nonrotating axle 20 may be press-fitted the inner race or cup 22 of the antifriction bearing generally indicated at 24, said antifriction bearing having rollers 26, 26 held in normal spaced relationship by the cage 28 and the outer race or cup 30 press-fitted as at 32 in the wheel hub 34. Abutting the inboard face of the inner cup or race 22 may be the shrink collar 36 having a baffle ring 38 fitted thereon as at 40 and supporting the oil deflector 42 adjacent the inner race or cup 22. The closure plate 44 affords a cover for the antifriction bearing cavity 52 and is secured to the wheel hub 34 by the nut and bolt assemblies 46, 46. Upon the wheel hub 34 may be press-fitted as at 50 the wheel 48.

The wheel hub 34 may be press-fitted to the rotating axle 18 at 54 and has a portion projecting beyond the end of said intermediate rotating axle 18 within which may be press-fitted as at 58 the outer race or cup 60 of the antifriction bearing 62. Said antifriction bearing 62 comprises the rollers 64, 64 held in normal spaced relationship by the cage 66 and the inner race or cone 68 press-fitted on the shoulder 70 formed on the inner nonrotating axle 16. Secured to the outboard end of the wheel hub 34 by means of bolts 72, 72 may be the closure plate 74 affording a cover for the antifriction bearing 62 and having an inwardly directed flange 76 supporting the oil deflector 78.

Abutting the outboard face of the cone 68 may be the sleeve 80 having a sliding fit on the inner nonrotating axle 16 and having its outboard end projecting slightly beyond the relieved shoulder 82 defining the threaded end of the inner nonrotating axle. On said threaded end may be an adjusting nut 84 in annular abutment at 86 against the outboard end of the sleeve 80 serving as means for adjusting the antifriction bearing 62. Adjacent the radially projecting flange 88 on the sleeve 80 may be mounted the cylinder housing 90 resiliently supported thereon as at 92. Reinforcing said cylinder housing on its inner face may be the spaced ribs 94, 94 and on its outer perimeter the radial ribs 96, 96. On the inboard perimeter of said housing may be supported the ring cylinder 98 integrally formed therewith or otherwise secured thereto. Within the ring cylinder 98 may be the ring type piston 100 and the packing 102, said piston having abutment against the outboard stator 104. Radially inwardly of the cylinder 98 may be formed at spaced intervals the inwardly directed studs 106, 106 and alternating therewith studs 108, 108, said studs forming supporting means respectively for the inboard stator 110 and the outboard stator 104. When the brakes are applied, the torque for the inboard stator 110 may be taken by the studs 106, 106 against which the ribs 112, 112, which may be welded to said stator 110, have abutment as at 113 (Figure 4). The torque for the outboard stator 104 is taken by means of the studs 108, 108 as by abutment of said stator 104 against said stud as at 115 (Figure 5). Between the outboard and inboard stators may be the outboard rotor 116 supported from the spaced outwardly bent-over flanges 118, 118 formed integrally on the outer perimeter of the inboard rotor 120. The inboard rotor 120 may be secured to the wheel hub 34 by the bolts 117, 117 of the nut and bolt assemblies 46, 46, each of said bolts having a square head 122 fitted into a square slot 124 formed adjacent the inner perimeter of the inboard rotor 120. The outboard rotor 116 may have the integrally formed spaced lugs 126, 126 (Figure 2) on its outer perimeter, each of said lugs having a hole therein to receive a rotor supporting bolt 128 which is secured at its outboard end in the bent-over portion of the flange 118. Lugs 130, 130 in alternate arrangement with the lugs 126, 126 afford a seat as at 132 (Figure 3) for a release spring plunger 134 which serves to maintain the outboard rotor in its normal released position. The plunger 134 has a shoulder 136 formed integrally therewith to provide a seat for the compression spring 138 which may be partially housed within a U-shaped strap 140 welded or otherwise secured to the inboard rotor 120. Sometimes it may be desirable to provide release springs 141, 141 sleeved over each of the outboard rotor supporting bolts 128, 128 and seated against the lugs 126, 126 and the inboard rotor 120 to provide additional release means for the outboard rotor 116. To maintain the stators in their normal released positions, each of the studs 106 and 108 has enclosed therein a release spring plunger 142 having a compression spring 144 sleeved thereover and retaining means 145 for said spring on its outer end. The release spring load may be taken by the plungers 142, 142, the plungers associated with the inboard stator 110 having their heads in abutment thereagainst and the plungers associated with the outboard stator 104 having their heads in abutment against the straps 114, 114 welded to said stator 104 on opposite sides of the studs 108, 108. Axial movement of said stators and rotors is thereby afforded and independent release means is provided for each of said rotors and stators.

The outboard stator and the inboard stator may have wear plates 146, 146 on opposite sides thereof, and the inboard rotor 120 may have the wear plate 148. Means for circulating air through the rotor and stator assembly is provided in the form of openings 166, 166 (Figure 2) in the cylinder casting 90.

Integrally formed on the outer perimeter of the cylinder casting 90 may be the diametrically opposed top and bottom torque lugs 150 and 152 affording pivotal connection as at 154 and 156 respectively for the ends of the torque arms 158 and 160 respectively (Figure 2). The said torque arms are diagonally arranged and pivotally connected at their opposite ends to each other and to the ends of the torque arms 159 and 161 connected respectively to the top and bottom torque lugs of the adjacent brake unit. By this means, the torque developed in the brakes of one wheel and axle assembly is counterbalanced by that developed in an adjacent wheel and axle assembly. When the wheels are rotating in a clockwise direction as seen in Figure 2, the torque will be taken by tension on the torque arms 158 and 161, and when they are rotating in a counterclockwise direction, the tension will be taken on the torque arms 159 and 160. Thus the torque stresses developed by the braking action are counterbalanced and absorbed within the braking device and are not transmitted to the truck structure. To those skilled in the art, it will be readily apparent that in a vehicle moving always in a given direction, only a single pair of such torque arms will be required, one of said arms being connected at the top of one brake assembly and the other of said arms being connected at the bottom of an adjacent brake assembly, and our invention contemplates such an arrangement.

When it is desired to remove the outboard rotor from the wheel and axle assembly, the outboard rotor supporting bolts may be removed and the rotor turned so that the lugs 126, 126 and 130, 130 clear the bent-over flanges 118, 118, thus permitting the stator assembly and the outboard rotor to be slipped off the inner axle.

In operation the piston moves axially in an inboard direction against the outboard stator 104, and successively forces said stator 104, the outboard rotor 116, and the inboard stator 110 into a pile against the inboard rotor 120 for frictional engagement therewith. Release of the power means permits the rotors and stators independently to assume their normal released positions by operation of the release springs already described.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a vehicle, a frame, supporting wheel and axle assemblies, each of said assemblies comprising an inner nonrotating axle enclosed in a rotating axle, an outer nonrotating axle sleeved thereover, a wheel on said rotating axle, rotor means carried by said wheel, stator means supported from said inner axle, operating means for said rotor means and said stator means including a ring cylinder resiliently supported from said inner nonrotating axle, and a torque arm connected for cooperative action with a torque arm of an adjacent wheel and axle assembly.

2. In a vehicle, an inboard journal box, a truck frame supported thereon, a supporting wheel and axle assembly comprising an inner nonrotating axle and an outer nonrotating axle, a rotating axle therebetween, a wheel on said rotating axle, braking means comprising rotors supported from said rotating axle, stators supported from said inner nonrotating axle, and means for bringing said rotors and stators axially into frictional engagement, said means comprising a cylinder resiliently mounted on one of said axles, and a ring piston therein.

3. In a vehicle, a wheel and axle assembly comprising a plurality of nonrotating axles, a rotating axle having a wheel fitted thereon, braking means including a rotor supported from said wheel, a stator supported from certain of said nonrotating axles, and means for moving said rotors and stators into frictional engagement, said means comprising a cylinder housing supported from one of said nonrotating axles, and a plurality of torque arms connected for counterbalancing with corresponding torque arms of an adjacent wheel and axle assembly.

4. In a vehicle, an inboard journal box, a supporting wheel and axle assembly including an inner axle, an outer axle, an intermediate axle therebetween, a wheel on said intermediate axle, rotor means supported from said wheel, stator means supported from said inner axle, means for moving said rotors and stators axially into engagement, said means comprising a cylinder housing carried on said inner axle, a cylinder integrally formed thereon, and a piston within said cylinder.

5. In a vehicle, a wheel and axle assembly comprising a plurality of nonrotating axles, a rotating axle having a wheel fitted thereon, braking means including a rotor supported from said wheel, a stator supported from certain of said nonrotating axles, and means for moving said rotor and stator into frictional engagement, said means including a cylinder housing slidably supported from one of said nonrotating axles and a ring cylinder integrally formed therewith.

6. In a vehicle, an inboard journal box, a supporting wheel and axle assembly including an inner axle, an outer axle, an intermediate axle therebetween, a wheel on said intermediate axle, rotor means supported from said wheel, stator means supported from said inner axle, means for moving said rotor and stator means axially into engagement, said means including a ring cylinder resiliently supported from said inner axle, and a piston therein.

7. In a vehicle, a wheel and axle assembly comprising a plurality of nonrotating axles, a rotating axle having a wheel fitted thereon, braking means including a rotor supported from said wheel, a stator supported from certain of said nonrotating axles, and means for moving said rotor and stator into frictional engagement, said means comprising a ring cylinder resiliently supported around certain of said nonrotating axles.

8. In a vehicle, supporting wheel and axle assemblies, each comprising inner and outer nonrotating axles, a rotating axle therebetween, a wheel on said rotating axle, rotor means supported from said wheel, stator means supported from said inner nonrotating axle, means for actuating said rotor and stator means, said means comprising a cylinder housing, and torque arms counterbalancingly connecting adjacent cylinder housings.

9. In a vehicle, a wheel and axle assembly comprising an inner axle, an outer axle, an intermediate axle therebetween having a wheel thereon, rotor means supported on said intermediate axle, an antifriction bearing between said wheel and said inner axle, stator means supported on said inner axle, and means resiliently supported on said inner axle for actuation of said rotor and stator means.

10. In a vehicle, a frame, supporting wheel and axle assemblies, each of said assemblies comprising an inner nonrotating axle enclosed in a rotating axle, an outer nonrotating axle sleeved thereover, a wheel on said rotating axle, rotor means carried by said wheel, stator means supported from said inner axle, and operable means on said inner nonrotating axle for moving said rotor means and said stator means into engagement.

11. In a vehicle, a wheel and axle assembly comprising an inner axle, an outer axle, an intermediate axle therebetween, a wheel supported on said intermediate axle and said outer axle, rotor means supported on said intermediate axle, an antifriction bearing between said wheel and said inner axle, stator means supported on said inner axle, and means on certain of said axles for operating and releasing said rotor and stator means.

12. In a vehicle, a truck frame, spaced supporting wheel and axle assemblies, each comprising a plurality of nonrotating axles with a rotating axle therebetween, braking means supported by said rotating axle and certain of said nonrotating axles and including a nonrotatable member having a torque arm, a pivotal counterbalancing connection between the torque arms of adjacent assemblies, and independent release means for the brake parts associated with said member and said means respectively.

13. In a vehicle, a wheel and axle assembly comprising an inner axle, an outer axle, an intermediate axle therebetween supporting with said outer axle a wheel, rotor means supported on said intermediate axle, an antifriction bearing between said wheel and said inner axle, stator means supported on said inner axle, and independent means for operating and releasing said rotor and stator means.

14. In a vehicle, a truck frame, a supporting wheel and axle assembly comprising a rotating axle with a wheel thereon and a nonrotating axle, rotors supported from said wheel, stators and operating means resiliently and slidably supported from said nonrotating axle, and independent release means associated with said stators and rotors respectively.

15. In a vehicle, a frame, spaced supporting wheel and axle assemblies, each comprising a rotating axle having a wheel supporting brake means and a nonrotating axle supporting a brake member for engagement with said braking means, a torque arm on each of said brake members, and a counterbalancing connection between said torque arms.

16. In a railway vehicle, a truck frame, spaced supporting wheel and axle assemblies, each comprising an intermediate axle, a wheel thereon, an outer axle supporting said frame, an inner axle supporting a brake member, a torque arm on said brake member, and a counterbalancing connection between the torque arms of adjacent assemblies.

17. In a vehicle, an inboard journal box, a supporting wheel and axle assembly including an inner axle, an outer axle, a rotating axle therebetween, a wheel supported from said outer axle and said rotating axle, rotor means supported from said wheel, stator means supported from said inner axle, and means on one of said axles for moving said rotor and stator means axially into engagement.

18. In a vehicle, a wheel and axle assembly comprising a plurality of nonrotating axles, a rotating axle, a wheel supported from said rotating axle and one of said nonrotating axles, braking means including a rotor supported from said wheel, a stator supported from the other of said nonrotating axles, and means on said last mentioned axle for moving said rotors and stators into frictional engagement.

19. In a vehicle, a truck frame, spaced supporting wheel and axle assemblies each comprising non-rotating axles and a rotating axle therebetween, braking means supported from each of said assemblies including a member having a diagonally arranged torque arm, and a pivotal counterbalancing connection between the torque arms of adjacent assemblies.

20. In a railway vehicle, a truck frame, spaced wheel and axle assemblies each comprising nonrotating axles and a rotating axle therebetween with a wheel thereon, antifriction means between said wheel and said nonrotating axles, braking means associated with each assembly comprising a torque, and a pivotal counterbalancing connection between said torque arms.

21. In a vehicle, a wheel and axle assembly comprising a rotating axle, a plurality of nonrotating axles, a wheel supported from said rotating axle and one of said nonrotating axles, rotor means supported from said wheel, stator means supported from the other of said nonrotating axles, and operable means slidably supported on said last-mentioned axle for bringing said rotor and stator means into friction engagement.

22. In a vehicle, a wheel and axle assembly comprising a rotating axle, a plurality of nonrotating axles, a wheel supported from said rotating axle and one of said nonrotating axles, rotor means supported from said wheel, stator means supported from the other of said nonrotating axles, and operable means resiliently supported on said last-mentioned axle for bringing said rotor and stator means into frictional engagement.

23. In a vehicle, a wheel and axle assembly comprising a rotating axle, a plurality of nonrotating axles, a wheel supported from said rotating axle and one of said nonrotating axles, rotor means supported from said wheel, stator means supported from the other of said nonrotating axles, operable means supported on said last-mentioned axle for bringing said rotor and stator means into frictional engagement, and means on said assembly affording a counterbalancing connection with an associated adjacent wheel and axle assembly.

24. In a vehicle, a wheel and axle assembly comprising inner and outer axles, an intermediate axle therebetween, a wheel mounted on said intermediate axle and one of said other axles, a rotor supported from said intermediate axle, a stator supported from certain of said other axles, and means on said last-mentioned axle for moving said rotor and stator into engagement.

25. In a vehicle, a frame, spaced supporting wheel and axle assemblies, each including inner and outer axles, an intermediate axle therebetween, a wheel supported from said intermediate axle and one of said other axles, braking means on each of said assemblies including a rotor supported from said wheel, a stator supported from certain of said other axles, means on each of said assemblies for moving said rotor and stator into engagement, and a counterbalancing connection between adjacent assemblies.

26. In a vehicle, a wheel and axle assembly comprising inner and outer axles, an intermediate axle supporting with certain of said other axles a wheel, an adjustable sleeve on said inner axle, rotor means supported from said wheel, and stator means and power means supported from said sleeve, said power means being operable to bring said rotor and stator means into engagement.

27. In a vehicle, a wheel and axle assembly comprising inner and outer axles, an intermediate axle supporting with certain of said other axles a wheel, an adjustable sleeve on said inner axle, rotor means supported from said wheel, and stator means and power means resiliently supported from said sleeve, said power means being operable to bring said rotor and stator means into engagement.

28. In a vehicle, a wheel and axle assembly including a plurality of nonrotating axles, a rotating axle therebetween having a wheel thereon, bearings between said wheel and said nonrotating axles, braking means comprising rotors supported from said rotating axle, stators supported on certain of said nonrotating axles, and means on said last-mentioned axle for operating said braking means.

29. In a vehicle, a wheel and axle assembly including a plurality of nonrotating axles, a rotating axle therebetween having a wheel thereon, bearings between said wheel and said nonrotating axles, braking means comprising rotors supported from said rotating axle, stators supported on certain of said nonrotating axles, and means resiliently mounted on said last-mentioned axle for operating said braking means.

30. In a vehicle, a wheel and axle assembly including a plurality of nonrotating axles, a rotating axle therebetween having a wheel thereon, bearings between said wheel and said nonrotating axles, braking means comprising rotors supported from said rotating axle, stators supported on certain of said nonrotating axles and independent release means for said rotors and stators respectively.

31. In a vehicle, a truck frame, spaced supporting wheel and axle assemblies each including nonrotating axles and a rotating axle and a wheel thereon, antifriction means between said wheel and said nonrotating axles, braking means on each of said assemblies including interleaved rotating and nonrotating brake elements, and counterbalancing means for said braking means including a member extending between adjacent assemblies and connecting certain of said nonrotating elements.

32. In a vehicle, a truck frame, spaced supporting wheel and axle assemblies each including nonrotating axles and a rotating axle therebetween, braking means on each of said assemblies including interleaved rotating and nonrotating braking elements supported respectively by the adjacent wheel and certain of said nonrotating axles, and counterbalancing means for said braking means including diagonal members connected to the nonrotating elements on adjacent assemblies and pivotally connected to each other intermediate said assemblies.

33. In a vehicle, a frame, spaced supporting wheel and axle assemblies, each comprising a rotating axle having a wheel supporting brake means, and a nonrotating axle supporting a brake member for engagement with said brake means, and a torque transmitting device comprising an arm connected to the top of said brake member, and an arm connected to the bottom of the brake member of the adjacent assembly, said arms being pivotally connected to each other.

34. In a vehicle, a frame, spaced supporting wheel and axle assemblies, each comprising a rotating axle having a wheel supporting brake means and nonrotating axles, one of which supports a resiliently mounted brake member for engagement with said brake means, and torque arms connected to brake members on adjacent assemblies and pivotally connected to each other intermediate said assemblies for counterbalancing torque forces therein.

35. In a vehicle, a frame, spaced supporting wheel and axle assemblies, each including inner and outer axles, an intermediate axle having a wheel thereon, rotating and nonrotating braking elements supported on said intermediate axle and said inner axle respectively, means for bringing said elements into frictional engagement, and means counterbalancingly connecting nonrotating brake elements on adjacent assemblies.

36. In a vehicle, a wheel and axle assembly including a plurality of nonrotating axles, a rotating axle therebetween having a wheel thereon, braking means comprising rotors supported from said rotating axle, stators supported on certain of said nonrotating axles, and means on said last-mentioned axle for operating said braking means, and independent release means for said rotors and stators respectively.

WALTER H. BASELT.
WESLEY A. HELSTEN.

CERTIFICATE OF CORRECTION.

Patent No. 2,280,782.  April 28, 1942.

WALTER H. BASELT, ET AL.

It is hereby certified that error appears in the printed specification of the above numbered patent requiring correction as follows: Page 2, second column, line 18, for "of" read --on--; page 4, first column, line 33, claim 20, after "torque" insert --arm--; and line 43, claim 21, for 'friction" read --frictional--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.